United States Patent
Nickel et al.

(10) Patent No.: US 6,952,905 B2
(45) Date of Patent: Oct. 11, 2005

(54) STONE PANEL CONNECTOR

(76) Inventors: Richard N. Nickel, R.R. 1 South, LCD9, Edmonton, AB (CA), T6H 4N8; Mike Nickel, R.R. 1 South, LCD9, Edmonton, AB (CA), T6H 4N8; Kim Giebelhaus, Site 45, Box 12, R.R. 4, Sherwood Park, AB (CA), T8A 3R4

( * ) Notice: Subject to any disclaimer, the term of this patent is extended or adjusted under 35 U.S.C. 154(b) by 0 days.

(21) Appl. No.: 10/248,640

(22) Filed: Feb. 3, 2003

(65) Prior Publication Data

US 2004/0148897 A1 Aug. 5, 2004

(51) Int. Cl.$^7$ .............................................. E04B 1/38
(52) U.S. Cl. ...................... 52/711; 52/513; 52/582.1; 52/586.2; 403/381
(58) Field of Search .................. 52/513, 426, 582.1, 52/586.2, 590.1, 698, 710, 711, 271, 282.1; 403/387, 296, 286, 409.1, 381

(56) References Cited

U.S. PATENT DOCUMENTS

| | | | |
|---|---|---|---|
| 2,127,285 A | | 8/1938 | Brecht |
| 2,792,263 A | * | 5/1957 | Nelezyty ..................... 403/189 |
| 3,402,954 A | * | 9/1968 | Simon ......................... 403/381 |
| 3,451,158 A | | 6/1969 | Fischer |
| 3,547,472 A | * | 12/1970 | Ehrman ....................... 403/381 |
| 4,556,337 A | * | 12/1985 | Marshall ..................... 403/255 |
| 4,867,598 A | * | 9/1989 | Winter, IV ................... 403/381 |
| 4,951,440 A | | 8/1990 | Staeger |
| 4,962,914 A | * | 10/1990 | Taylor ........................... 256/72 |
| 5,244,300 A | * | 9/1993 | Perreira et al. ............. 403/381 |
| 5,433,416 A | * | 7/1995 | Johnson ................... 248/475.1 |
| 5,762,410 A | * | 6/1998 | Lutz ............................. 312/111 |
| 6,237,298 B1 | | 5/2001 | Castano |
| 6,659,677 B1 | * | 12/2003 | Exposito ....................... 403/24 |
| 6,837,016 B2 | * | 1/2005 | Simmons et al. ........... 52/655.1 |

FOREIGN PATENT DOCUMENTS

| | | |
|---|---|---|
| DE | 295 06 053 | 8/1995 |
| DE | 100 56 177 A | 5/2002 |
| EP | 0 756 044 A | 1/1997 |
| FR | 1 374 953 A | 10/1964 |
| GB | 1 248 905 A | 10/1971 |

* cited by examiner

*Primary Examiner*—Brian E. Glessner
(74) *Attorney, Agent, or Firm*—Bennett Jones LLP

(57) ABSTRACT

The present invention relates to a connector for connecting two or more panels of stone together. In one embodiment of the invention, the invention comprises a connector having a body with a first and a second end and at least two symmetrically orientated slots, each slot having an open end and an enclosed end. The invention is further comprised of at least two bolts, each such bolt having a shaft for attachment into a stone panel and a head protruding from the surface of the stone panel, the outer edge of the head having a consistent diameter suitable for insertion into the open end of a slot on the connector wherein bolt head is inserted into the open end of the slot and moved through the slot to a secure position proximate to the enclosed end.

9 Claims, 5 Drawing Sheets

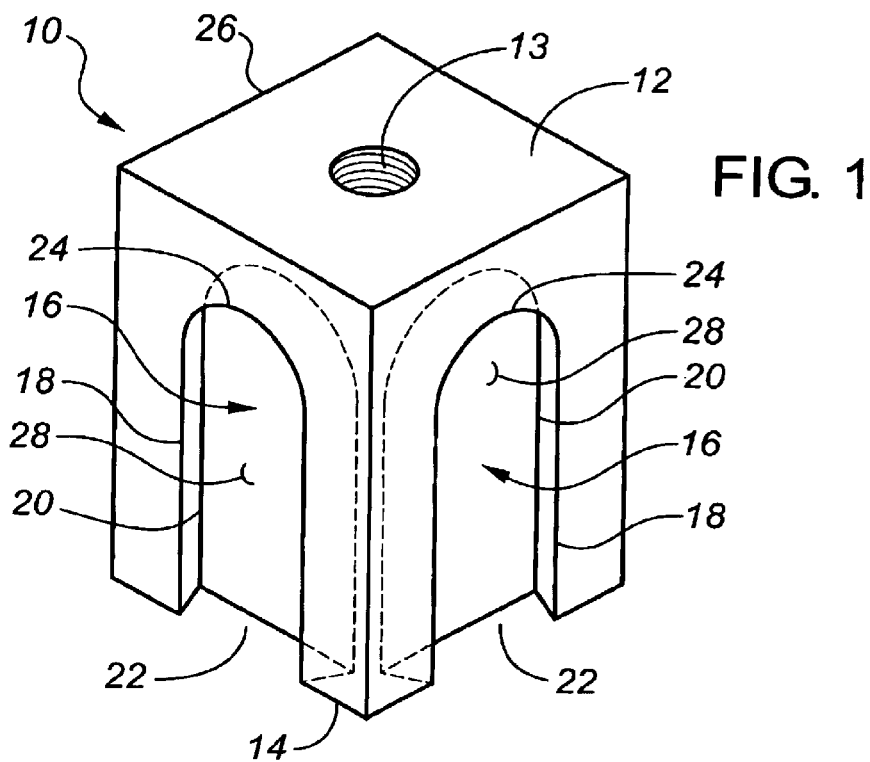
FIG. 1
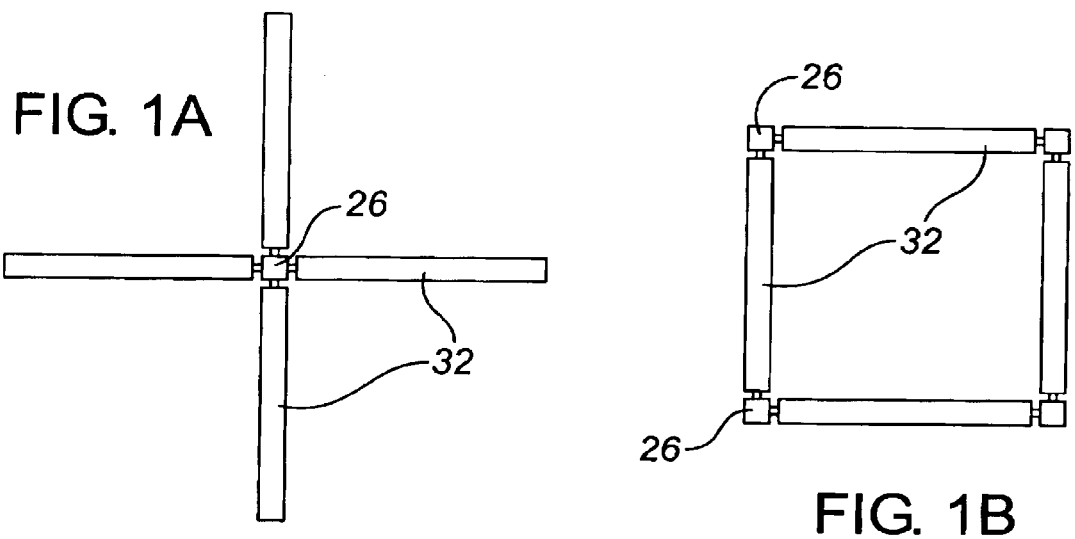
FIG. 1A
FIG. 1B

STONE PANEL CONNECTOR

BACKGROUND OF INVENTION

The present invention relates to a connector for connecting two or more panels of stone or concrete together.

The use of slabs of stone in pieces of furniture is well known and in particular slabs of stone are commonly connected together to form a base for a table or to form a desk-top. Currently there are several commonly used systems for connecting stone panels. One such system involves the use of epoxy to join the panel sections. However, in this system, the glued joints must finished by the stone fabricator after the joining has occurred. Further, this type of panel construction takes up a large volume of shipping space and the amount of breakage during shipping is relatively high as the shape of the finished panel is generally quite fragile. The gluing of stone panels together takes a considerable amount of labour time and cannot be subsequently disassembled for moving or storage.

Another system that is used to join stone panels has been adapted from a system used to connect glass panels. In this system, the edge of the stone is inserted into slot and a set screw is then tightened onto the stone's surface. This system is dependent upon having panels of consistent thickness and often stone panels will not have such uniform widths. In the stone industry variances of 2 millimieters for 2–3 centimeter thick panels are common but variances are often greater. Also, the set screws have a tendency to work loose through time causing the owner to have to have to continually tighten them or risk connection failure.

Therefore, there is a need in the art for an improved system for connecting stone or concrete panels that overcomes the problems with the current systems as discussed above.

SUMMARY OF INVENTION

The present invention is directed to an apparatus for attaching panels of stone or concrete to similar panels or to other objects.

Accordingly, in one aspect of the invention, the invention comprises an apparatus for connecting panels of stone or concrete comprising:

(a) a connector comprising a body having a central longitudinal axis and at least two faces, wherein each face defines a longitudinal slot, each slot having an open end and an enclosed end, and each slot having a transverse profile comprising a lip;

(b) at least two bolts, each such bolt having an elongate shaft for attachment into a stone panel and a head comprising a shape matching the transverse profile of the slots, such that the head may be inserted into the open end of a slot, moved longitudinally within the slot and is retained within the slot by the lip.

In one embodiment, the bolt head and slot "dovetail" together to allow movement along a longitudinal axis of the slot but to prevent movement transverse to the longitudinal axis.

In another embodiment the apparatus the slot is inclined with the slot being deeper at the enclosed end of the slot than it is at the open end, such that the head of the bolt is drawn towards the center of the connector as it is moved from the open end of the slot to the closed end of the slot.

In another aspect, the invention comprises a furniture base comprising at least two stone panels connected by means of the apparatus described herein.

In another aspect, the invention comprises a method of joining two stone panels each having two major surfaces and a joining edge, comprising the steps of:

(a) attaching at least one bolt into the joining edge of each stone panel, wherein each bolt comprises a head having an enlarged portion;

(b) connecting the at least one bolt of each stone panel together by means of a connector body having a central longitudinal axis and at least two faces, wherein each face defines a longitudinal slot, each slot having an open end and an enclosed end, and each slot having a transverse profile comprising a lip, wherein the enlarged portion of a bolt head may slide longitudinally within a slot but is retained by the lip.

In another aspect, the invention comprises an apparatus for joining a stone or concrete piece to another object, comprising:

(a) a connector comprising a body having a central longitudinal axis and at least one face defining a longitudinal slot having an open end and an enclosed end, and having a transverse profile comprising a lip;

(b) means for attaching the connector to the object;

(c) a bolt having an elongate shaft for attachment into a stone panel and a head comprising a shape matching the transverse profile of the slots, such that the head may be inserted into the open end of a slot, moved longitudinally within the slot and is retained within the slot by the lip.

In one embodiment, the connector body comprises at least two faces and the means for attaching the connector to the object is a clip having a head comprising a shape matching the transverse profile of the slots, such that the head may be inserted into the open end of a slot, moved longitudinally within the slot and is retained within the slot by a lip. The clip further includes arms which position or retain the connector body within the object.

BRIEF DESCRIPTION OF DRAWINGS

The invention will now be described by way of an exemplary embodiment with reference to the accompanying simplified, diagrammatic, not-to-scale drawings. In the drawings:

FIG. 1 is a schematic depiction of one embodiment of a connector. FIG. 1A shows the connector in combination with four panels. FIG. 1B shows an alternative arrangement of four panels.

DETAILED DESCRIPTION

Figure 5:
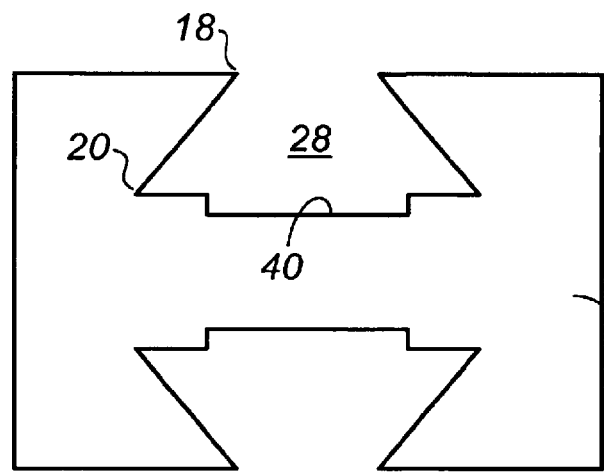
FIG. 5 is a top view of a cross section of a connector.
Figure 6:
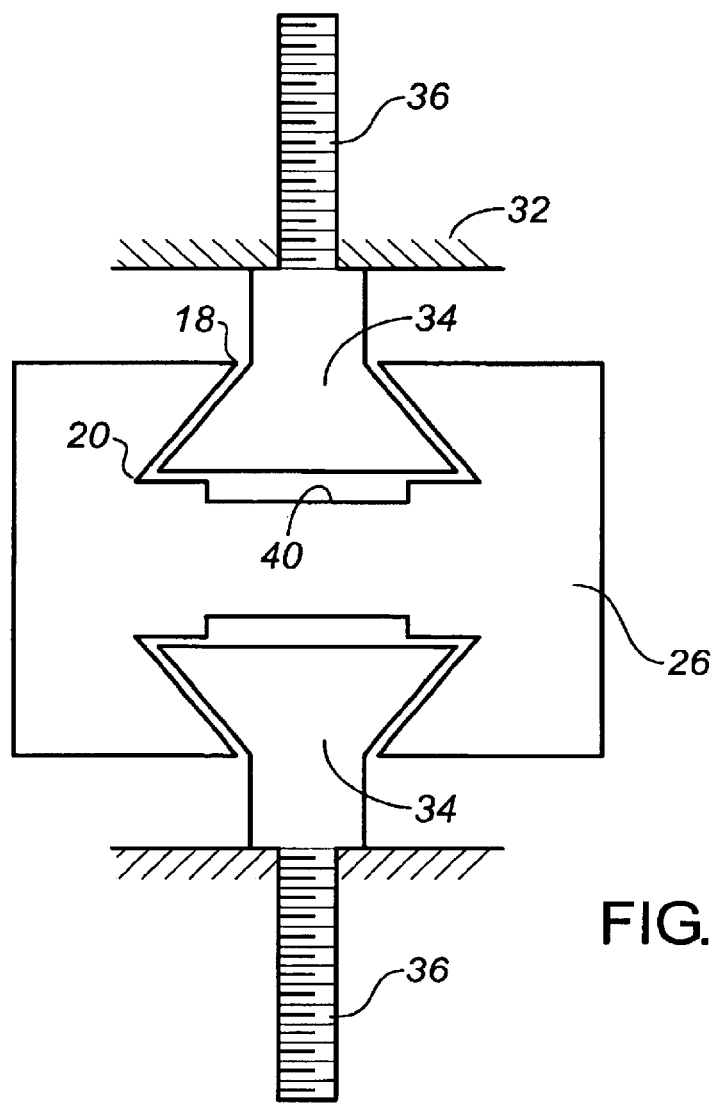
FIG. 6 is a top view of a cross section of a connector with two bolts inserted into the slots.

The apparatus (10) according to the Figures comprises a connector (26) and at least two bolts (30). The connector (26) has a first (12) and second end (14) and at least one slot (16). The slots (16) are elongated vertically and have an open end (22) at the first end of the connector (14) and an enclosed end (24) proximate to the second end of the connector (12). As used herein, the term "vertical" shall mean the direction between the first and second ends of the connector. The term "horizontal" is of course transverse to the vertical direction. In one embodiment the slots (16) are cavities recessed into the exterior surface of the connector (26). The inside edge of the cavity (20) has a width greater than or equal to the diameter of the head of the bolts (34). The outside edge of the cavity (18) has a width less than the diameter of the head of the bolt (34). Accordingly the cavity (28) is wedge shaped in the horizontal plane, as depicted in the end view of one embodiment shown in FIG. 5 with the outer edge of the cavity (18) forming a lip that retains the bolt (30) when it is inserted into the slot (16) as depicted in FIG. 6. In a further embodiment the cavity (28) may further comprise a rectangular groove (40) situated inside the inside edge of the cavity (20) as shown in FIGS. 5 and 6. A wedge shaped cavity may be created such that it matches the shape of the bolt head (34) as shown in FIG. 6.

In a further embodiment the slots (16) are tapered such that the lower edge of the cavity (20) is deeper at the enclosed end of the slot (24) and the distance between the lower edge (20) and the upper edge (18) is greater at the enclosed end (24). This creates a thicker lip at the enclosed end (24). This results in the bolt (30) being drawn towards the center of the connector (26) as it moves from the open end (22) to the closed end (24). This in turn draws the attached stone panel closer to the connector (26). Preferably, the dimensions of the connector and the bolt are such that the connector contacts the stone panel when the connector, bolt and stone panel are assembled together. Relatively tight contact between the connector and the stone panel contributes to the stability of the assembly.

The connectors (26) may be used to join two or more panels together as depicted in FIGS. 1A, 7, 8 and 9. The shape of the connector (26) and the orientation of the slots (16) can be varied depending on the desired relative position of the stone panels (32) to each together after they have been connected. If the connector (26) is square and has four slots (16) as shown in FIG. 1, then obviously it may be used to connect four stone panels in an "X" pattern as shown in FIG. 1A. Alternatively, panels may be joined in a square pattern using four connectors as shown in FIG. 1B. The connectors in FIG. 1B obviously require slots on only 2 sides.

Figure 8:
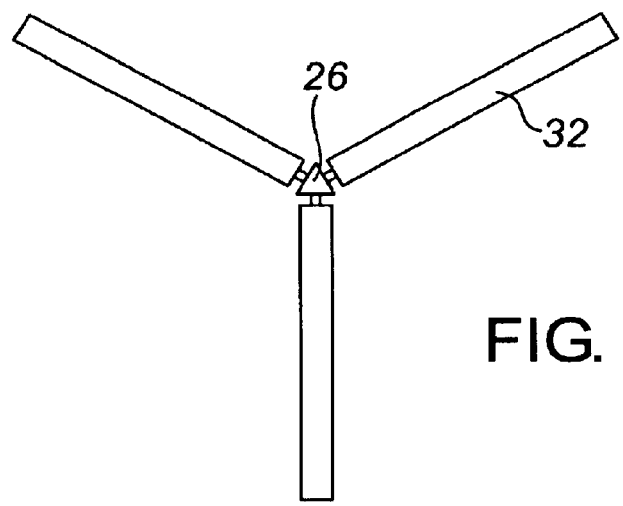
FIG. 8 is a top view of one embodiment of a connector and attached stone panels.

The dimensions or shape, or both, of the connector (26) may be altered for aesthetic or practical reasons. The connector may have any number of faces and slots, which dictates how many panels the connector may be used in connection with. As shown in FIGS. 5 and 6, the connectors may have two opposing slots, which permits the connector to join panels end to end. As shown in FIG. 8, the connector may have three slots and a triangular shape.

Figure 7:
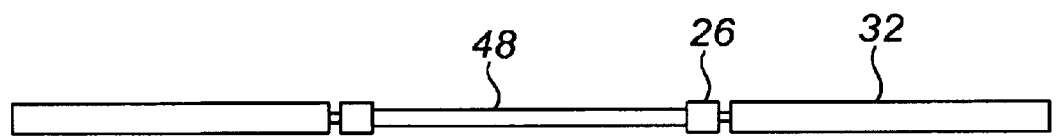
FIG. 7 is a top view of one embodiment of the invention.
Figure 9:
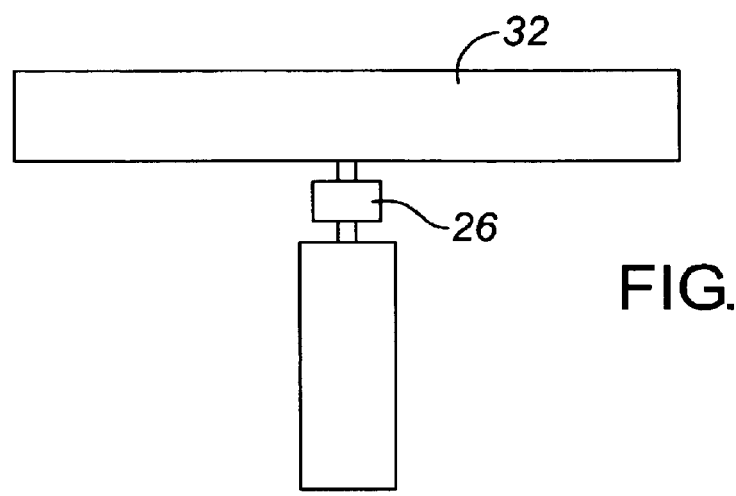
FIG. 9 is a top view of a side to end attachment configuration.

The connector (26) may be used to connect the edges of panels as shown in FIGS. 7 and 8, or if thick stone panels are being used, the edge of one panel may be adjoined to the side of another panel a shown in FIG. 9. The shapes of the sides of the connectors (26) may be varied to ensure that they sit flush to the stone surface that the bolt has been mounted into.

Figure 2:
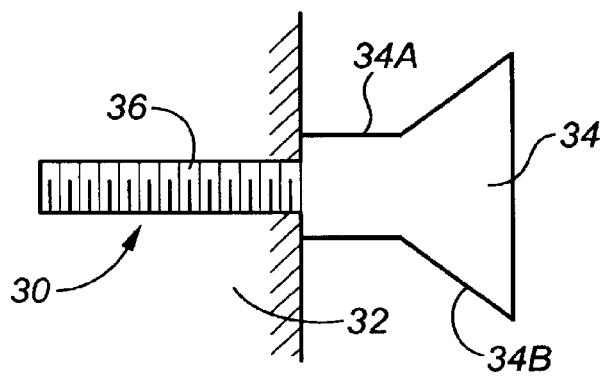
FIG. 2 is a side view in section of one embodiment of a bolt inserted into a stone panel.
Figure 3:
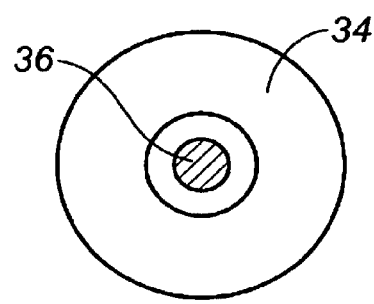
FIG. 3 is a top view of one embodiment of a bolt.
Figure 4:
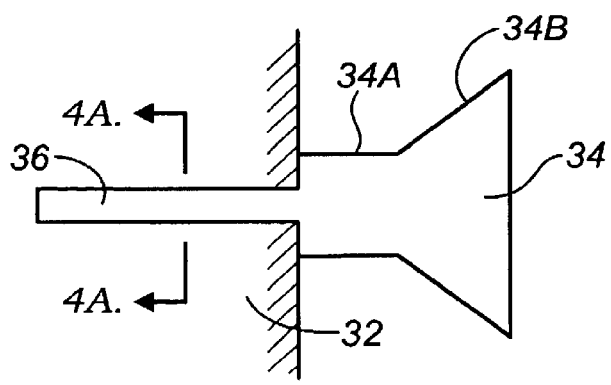
FIG. 4 is a side view in section of one embodiment of a bolt inserted into a stone panel.
Figure 4A:
FIG. 4A is a cross-sectional view of the bolt of FIG. 4.

As depicted in FIGS. 2, 3 and 4 the bolts have shaft (36) and a head (34). The bolt (30) is inserted into the stone panel by drilling a hole corresponding to the size of the shaft (36) and by then inserting the shaft (36) into the hole along with appropriate epoxy. The shaft (36) may be any number of shapes depending on the size and nature of the stone panels being connected. In one embodiment the shaft (36) is substantially cylindrical as shown in FIGS. 2 and 3 and is threaded to facilitate better adhesion to the epoxy. For a cylindrical shaft a typical stone drill bit can make the plughole for the shaft to be set into. In another embodiment as shown in FIG. 4, the shaft (36) is flat with a rectangular cross-section, suitable for narrow stone panels. For such a flat shaft, a typical stone-cutters blade may be used to make the slot in the panel for the shaft (36) to be set into.

As depicted in FIGS. 2 and 4, in one embodiment, the bolt head (34) comprises a cylindrical portion (34A) and a wedge portion (34B). The cylindrical portion is cylindrical in shape immediately adjacent to the attachment point to the shaft (36) and accordingly has a shoulder which rests against the stone upon installation. The length of this cylindrical portion may be varied to match the depth of the slots in the connector. The wedge portion has an increasing diameter which fits within and is retained by the slots described above. If the bolt head (34) is circular when view head-on, which is not necessarily the case, the wedge portion will of course be conical. If the bolt head is square when viewed head-on, the wedge portion will be pyramidal. This shape of the bolt head may be varied to any shape that matches the corresponding slot in the connector.

The use of such inserted bolts (30) to attach to the connector (26) means that the system is not vulnerable to failure if the thickness of the panels to be connected vary. Further, the bolts can be installed on site and do require finishing by a stone fabricator. This also means that the stone panels do not have to be shipped connected together reducing both cargo space and the incidence of breakage during shipping.

The connectors (26) and bolts (30) may be constructed from woods, plastics and metals or such other materials as are suitable and as would be selected by one skilled in the art.

As shown in FIG. 7, connectors (26) may be linked by rods or bars (40) to cover open space spans between the panels. If such rods or bars (40) are used it may be preferable that a restraining clip or pin should be mounted on the bottom of the connector (26) to prevent someone's foot or leg from striking the bar or rod (40) and knocking the connectors (26) off the panels.

The use and operation of the apparatus (10) will now be described with reference to the Figures. Holes are drilled into the edges of the stone panels (32) at identical heights. The bolt shafts (36) are inserted and fixed with an adhesive such as an epoxy. The bolt head (34) shoulder is set against the surface of the stone. One of the panels (32) is held a vertical position and the open end (22) of a slot (16) on the connector (26) is aligned with the top of the bolt head (34) such that the slot (16) is parallel to the surface that the bolt (30) has been inserted into. The connector (26) is then pushed downwards causing the bolt head (34) to move up the slot (16). Because the slot is tapered inward toward the central axis of the connector, the stone panel and connector are drawn together until they contact or until the bolt head reaches the enclosed end of the slot (16). The enclosed end of the slot (24) prevents the connector (26) from sliding off the bolt head (34) and gravity prevents the connector (26)

from working itself loose. The process is then repeated for the second panel to be attached to the connector (26). When joining two vertical panels it is preferred that a minimum of two connectors (26) and 4 bolts (30) be used to promote stability and to prevent undue stress on the connectors. The connector (26) may be removed from the bolts (30) by striking it on its lower or first end (14) causing the connector (26) to move up and off the bolts. In a preferred embodiment the top of the connector (26) may have a threaded hole (13) to facilitate its removal with a threaded rod (not shown).

Figure 10:
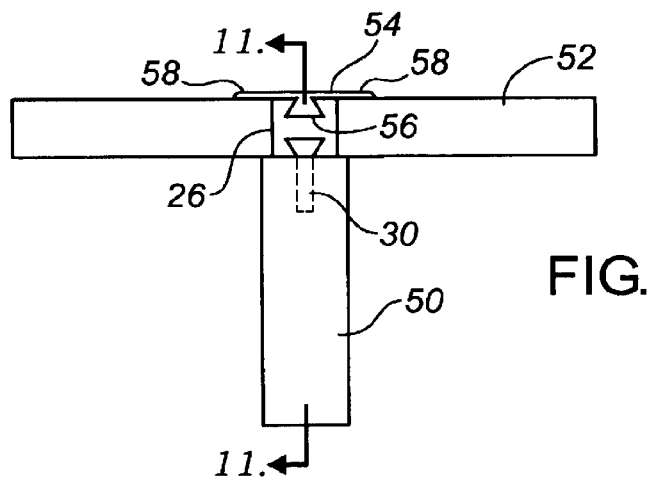
FIG. 10 is a top view of one embodiment of the invention showing the use of a connector and bolt to attach a stone piece to a vertical surface.
Figure 11:
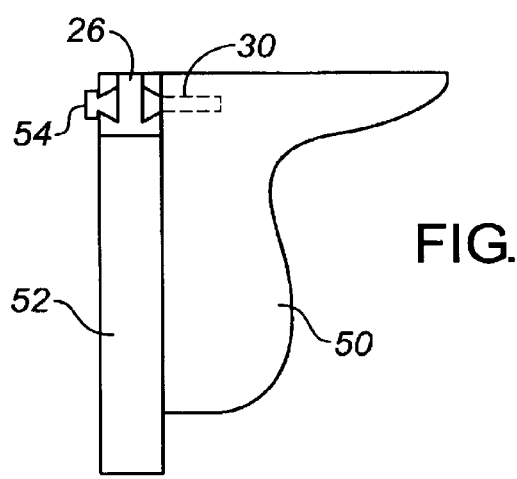
FIG. 11 is a sectional view of the embodiment of FIG. 10.

In another embodiment, the connector of the present invention may be used to attach stone or concrete panels to an object with a vertical surface. In one example, as illustrated in FIGS. 10 and 11, a stone mantle support bracket (50) may be attached to a stone lintel (52). A connector (26) as described above may be inserted into a groove cut into the top of the lintel (52). Preferably the connector closely fits the dimensions of the groove and is the same width. In this embodiment, the connector slot openings are oriented upwards, to receive the bolt head of a bolt (30) which has been inserted into the bracket (50). The bolt (30) will then be supported vertically and retained horizontally within the connector (26) to attach the bracket (50) to the lintel (52).

Figure 12:
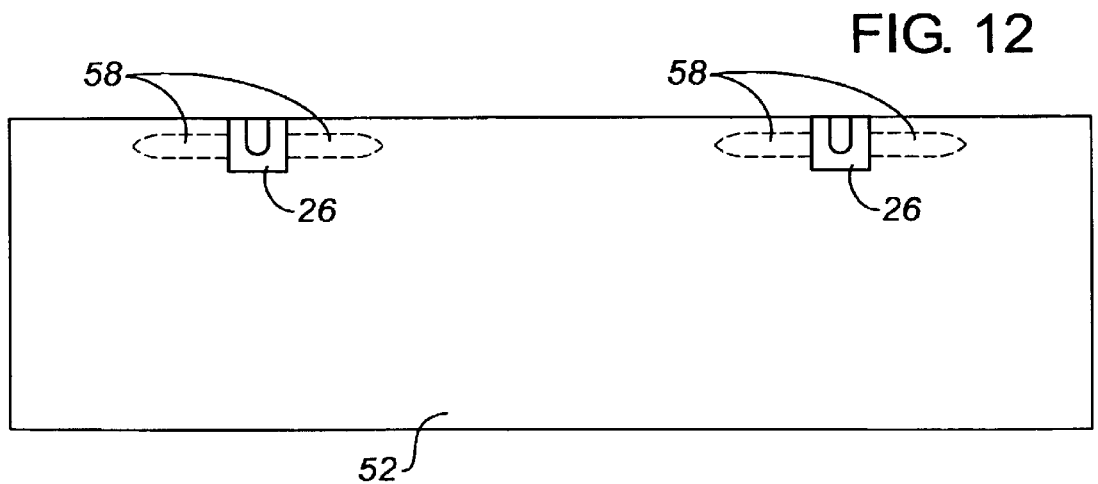
FIG. 12 is a front view of the embodiment of FIG. 10 showing the clip arms in dotted line.

On the reverse side of the connector and lintel, a retaining clip (54) has a head (56) which is configured identically to the bolt head, so as to engage the connector slot in the same manner. As seen in FIGS. 10 and 12, the laterally extending arms (58) of the clip prevent the connector from sliding out in a forward direction. If the connector is narrower or wider than the thickness of the lintel, the arms (58) of the clip may be bent backwards or forwards to retain the connector substantially flush with the front surface of the lintel.

As will be apparent to those skilled in the art, various modifications, adaptations and variations of the foregoing specific disclosure can be made without departing from the scope of the invention claimed herein.

What is claimed is:

1. An apparatus for connecting panels of stone comprising:
   (a) a connector comprising a body having a central longitudinal axis and at least two faces, wherein each face defines a longitudinal slot, each slot having an open end and an enclosed end, and each slot having a transverse profile comprising a lip and wherein each slot is inclined towards the central axis of the connector from the open end to the closed end;
   (b) at least two bolts, each such bolt having an elongate shaft for attachment into a stone panel and a head comprising a shape matching the transverse profile of the slots, such that the head may be inserted into the open end of a slot, moved longitudinally within the slot and is retained within the slot by the lip.

2. The apparatus of claim 1 wherein at least a portion of the head of the bolt is substantially conical in shape.

3. The apparatus of claim 2 wherein the shaft of the bolt is substantially cylindrical.

4. The apparatus of claim 2 wherein the shaft of the bolt has a rectangular cross-section.

5. The apparatus of claim 4 wherein the connector comprises four faces each defining a slot wherein the four faces are perpendicular to each other.

6. A furniture base comprising at least two stone panels connected by means of the apparatus of any one of claims 1 or 5.

7. The furniture base of claim 6 comprising four stone panels radiating outward from a central connector.

8. The furniture base of claim 6 comprising at least three stone panels connected circumferentially end to end.

9. An apparatus for joining a stone or concrete piece to another object, comprising:
   (a) a connector comprising a body having a central longitudinal axis and at least two faces, each defining a longitudinal slot having an open end and an enclosed end, and having a transverse profile comprising a lip;
   (b) a clip comprising a shape matching the transverse profile of the slots, such that the head may be inserted into the open end of a slot, moved longitudinally within the slot and is retained within the slot by the lip, and arms which position or retain the connector body within the object;
   (c) a bolt having an elongate shaft for attachment into a stone panel and a head comprising a shape matching the transverse profile of the slots, such that the head may be inserted into the open end of a slot, moved longitudinally within the slot and is retained within the slot by the lip.

* * * * *